(12) United States Patent
Choi et al.

(10) Patent No.: US 6,354,079 B1
(45) Date of Patent: Mar. 12, 2002

(54) APPARATUS AND METHOD OF PURIFYING NOX IN THE EXHAUST GAS OF THE DIESEL ENGINE

(75) Inventors: Sung Mu Choi; Seok Jae Kim, both of Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/533,299

(22) Filed: Mar. 23, 2000

(30) Foreign Application Priority Data

Nov. 26, 1999 (KR) ............................................. 99-53113
Dec. 30, 1999 (KR) ............................................. 99-66791

(51) Int. Cl.$^7$ ................................................ F01N 3/00
(52) U.S. Cl. ............................. 60/286; 60/274; 60/289; 60/295
(58) Field of Search ................... 60/274, 286, 289, 60/295, 307, 301; 422/171; 423/237

(56) References Cited

U.S. PATENT DOCUMENTS

| | | | | |
|---|---|---|---|---|
| 3,599,427 A | * | 8/1971 | Jones | ........................... 60/274 |
| 5,155,994 A | * | 10/1992 | Muraki et al. | ................. 60/301 |
| 5,369,956 A | * | 12/1994 | Daudel et al. | ................. 60/286 |
| 5,605,042 A | * | 2/1997 | Stutzenberger | ............... 60/286 |
| 5,628,186 A | * | 5/1997 | Schmelz | ......................... 60/286 |
| 5,643,536 A | * | 7/1997 | Schmelz | ......................... 60/286 |
| 5,778,667 A | * | 7/1998 | Kinugasa et al. | .............. 60/274 |
| 5,783,160 A | * | 7/1998 | Kinugasa et al. | ............ 423/237 |
| 5,894,068 A | * | 4/1999 | Kharas et al. | ............... 422/171 |
| 5,950,422 A | * | 9/1999 | Dölling | ......................... 60/286 |
| 6,092,367 A | * | 7/2000 | Dölling | ......................... 60/274 |
| 6,119,448 A | * | 9/2000 | Emmerling et al. | ........... 60/274 |
| 6,125,629 A | * | 10/2000 | Patchett | ........................ 60/286 |

* cited by examiner

Primary Examiner—Thomas Denion
Assistant Examiner—Tu M. Nguyen
(74) Attorney, Agent, or Firm—Christie, Parker & Hale, LLP

(57) ABSTRACT

An apparatus for purifying the nitric oxide in the exhaust gas of the diesel engine has a NOx adsorber converter mounted on an exhaust gas pipe close to the engine, a urea catalyst converter mounted on the exhaust gas pipe at some distance from the $NO_x$ adsorber converter, and a urea supplying means connected between the $NO_x$ adsorber converter and the urea catalyst converter.

2 Claims, 5 Drawing Sheets

APPARATUS AND METHOD OF PURIFYING NOX IN THE EXHAUST GAS OF THE DIESEL ENGINE

FIELD OF THE INVENTION

The present invention relates to an apparatus and method of purifying the nitric oxide in the exhaust gas of a diesel engine, and more particularly to an apparatus for purifying the nitric oxide in the exhaust gas of a diesel engine that is capable of purifying the nitric oxide in the exhaust gas efficiently at low temperature.

BACKGROUND OF THE INVENTION

Generally, a catalyst converter, through which exhaust gas passes, is mounted on an exhaust gas pipe, or an exhaust manifold, of an internal combustion engine. The catalyst converter converts the harmful materials in the exhaust gas, such as CO, HC, and NOx, into $CO_2$, $H_2O$, and $N_2$.

Among the harmful materials in the exhaust gas is $NO_x$. $NO_x$ is a general term for a nitric oxide such as NO, $NO_2$, $N_2O$. Air contains about 77% nitrogen and nitrogen is not easily oxidized under normal conditions. But nitrogen is oxidized under the high pressure and the high temperature in the combustion chamber of the internal combustion engine and becomes nitric oxide.

Nitric oxide injures the eyes and the lungs of people and causes the photochemical smog. Therefore, the nitric oxide contained in the exhaust gas of an automobile should be reduced or removed.

Additionally, a large amount of CH, CO, and $NO_x$ is discharged in the exhaust gas of a diesel engine. Therefore, the technical investigation to reduce or remove CH, CO, and $NO_x$ has proceeded.

Prior methods of removing the $NO_x$ include a quaternary catalyst reduction method, a hydrocarbon selection catalyst reduction method and a urea selection catalyst reduction method.

Because the quaternary catalysts have a low nitric oxide purifying efficiency (10% on a chasis dyno) the quaternary catalysts are not effective.

The hydrocarbon selection catalyst reduction method has a nitric oxide purifying efficiency of 35% or so on a chasis dyno, and does not have a high nitric oxide purifying efficiency even though the penalty of the fuel efficiency is 3%.

The urea selection reduction method has a nitric oxide purifying efficiency of not less than 65%. Therefore, the urea selection reduction method is considered the preferred method for purifying nitric oxide.

However, a urea selection reduction system using the urea selection catalyst method has not been utilized, because a suitable sensor for nitric oxide has not been developed until now. A urea injection system is operated depending on the output of the sensor for sensing several input data.

Furthermore, a general SCR (Selective Catalytic Reduction) and a $NO_x$ adsorber are commonly used to reduce the amount of the nitric oxide in the exhaust gas. A $Pt/Al_2O_3$ catalyst is commonly used as the SCR.

To satisfy the Europe Safety Regulation of nitric oxide, the nitrogen oxide purifying efficiency must be increased. Therefore new technology to reduce nitrogen oxide emissions is required.

According to the Europe Safety Regulation of nitric oxide, the particular amount of nitric oxide discharged at a particular temperature of exhaust gas, for traveling a particular unit distance, are described in table 1.

TABLE 1

Object of vehicle: 2000 cc

| Temperature (° C.) | Total $NO_x$/Total Distance (g/km) | Percentage (%) |
| --- | --- | --- |
| Above 300 | 0.50 | 22.16 |
| 250~300 | 0.33 | 14.67 |
| 200~250 | 0.28 | 12.18 |
| 150~200 | 0.29 | 12.66 |
| Below 150 | 0.87 | 38.33 |

As shown in Table 1, about 50% of the nitric oxide is discharged under a temperature of 200° C.

The activation temperature of the SCR (ex, $Pt/Al_2O_3$) is above 200° C., so the SCR cannot satisfy the Europe Safety Regulation of nitric oxide.

A $NO_x$ adsorber is mainly used in a Lean-burn Engine. Therefore, it is difficult to apply the $NO_x$ adsorber to a diesel engine maintained under an environment of higher oxygen.

The $NO_x$ adsorber occludes the $NO_x$ until the temperature of the exhaust gas reaches 200° C., and then the $NO_x$ is removed by activating the $NO_x$ adsorber. The activation of the $NO_x$ adsorber is accomplished by controlling the theoretical air—fuel ratio to 14.7. But in a diesel engine, it is very difficult to adjust the theoretical air—fuel ratio to 14.7.

To satisfy the Europe Safety Regulation of nitric oxide, at least 50% of the $NO_x$ contained in the exhaust gas of an automobile should be removed.

SUMMARY OF THE INVENTION

The object of the present invention is to provide an apparatus and method of purifying the nitric oxide contained in the exhaust gas of a diesel engine, which can increase the nitric oxide purifying efficiency to at least 50% or more.

To achieve the above object, the present invention comprises an $NO_x$ adsorber converter mounted on an exhaust gas pipe close to the engine, a urea catalyst converter mounted on the exhaust gas pipe at some distance from the $NO_x$ adsorber converter, and a urea supplying means connected between the $NO_x$ adsorber converter and the urea catalyst converter.

The urea supplying means comprises a tank full of urea, a feed pump for feeding the urea in the tank to the urea catalyst converter, an injector for discharging the urea mixed with air into the urea catalyst converter, a temperature sensor for sensing the temperature of the exhaust gas pipe, and a controller driving the feed pump based on the temperature of the sensor being higher than predetermined level.

The apparatus in accordance with the present invention occludes the $NO_x$ until the temperature of the exhaust gas reaches 200° C. using a BaO catalyst in the $NO_x$ adsorber converter. The $NO_x$ occluded in the converter is separated from the BaO catalyst and discharged.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PRESENT INVENTION

Figure 1:
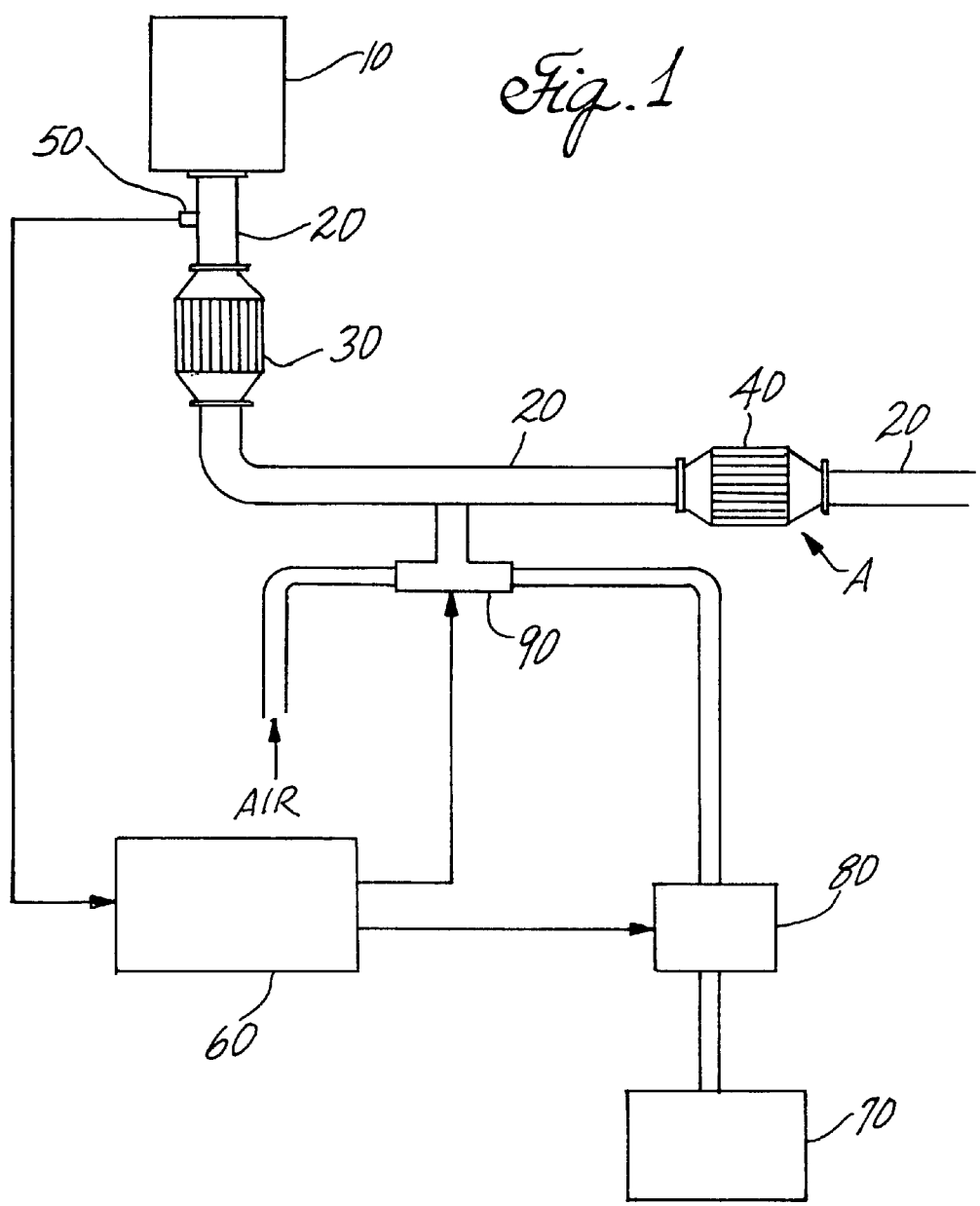
FIG. 1 is a schematic diagram of an apparatus for purifying the nitric oxide in the exhaust gas of the diesel engine in accordance with the present invention.

As shown in FIG. 1, an apparatus in accordance with the present invention comprises an $NO_x$ adsorber converter 30 mounted on an exhaust gas pipe 20 close to the engine 10, a urea catalyst converter 40 mounted on the exhaust gas pipe 20 at some distance from the $NO_x$ adsorber converter 30, and a urea supplying means connected between the $NO_x$ adsorber converter 30 and the urea catalyst converter 40.

The urea supplying means comprises a tank 70 full of urea, a feed pump 80 for feeding the urea in the tank 70 to the urea catalyst converter 40, an injector 90 for discharging the urea mixed with air into the exhaust gas pipe 20, a temperature sensor 50 for sensing the temperature of the exhaust gas pipe 20, and a controller 60 for driving the feed pump 80 based on the temperature of the sensor 50 being at a higher predetermined level.

The temperature sensor 50 is mounted on the exhaust gas pipe at the front end of the $NO_x$ adsorber converter 30. It is preferred that a thermocouple is used as a temperature sensor 50.

Figure 2:
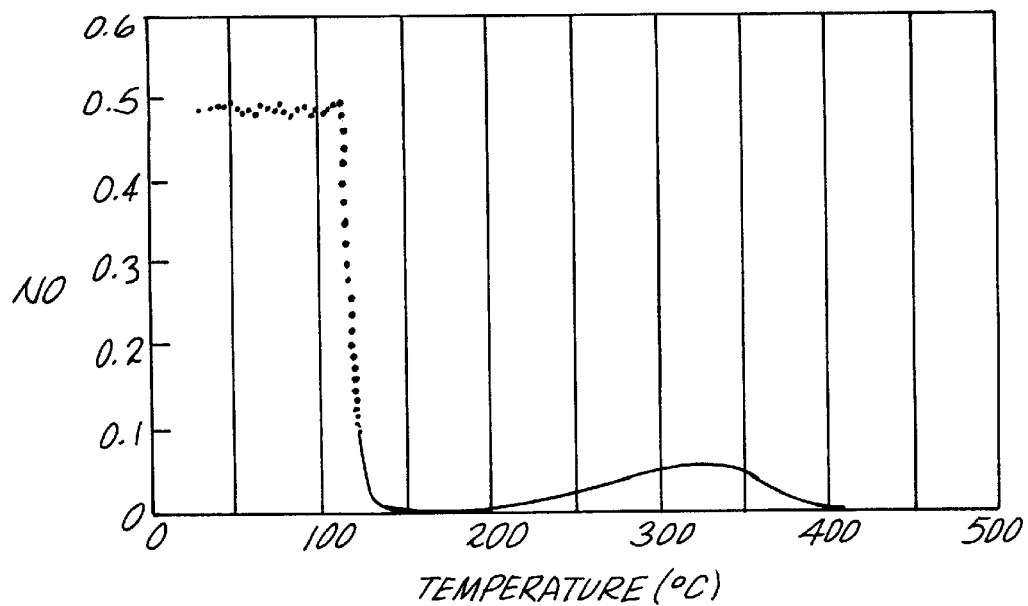
FIG. 2 is a graph showing the result of the test using the apparatus in accordance with the present invention.

FIG. 2 is a graph showing that the amount of the NO is varied according to the change of the temperature at the $NO_x$ adsorber converter 30 through which 500 ppm of NO passed in an environment of 8.5% oxygen. BaO, a material occluding $NO_x$, is used as the catalyst.

In an environment of higher oxygen, the $NO_x$ absorber converter 30 occludes the $NO_x$ when the temperature of the exhaust gas is below 200° C. and discharges the $NO_x$ when the temperature of the exhaust gas is above 200° C. Therefore, at least 50% of the $NO_x$ can be purified.

Figure 3:
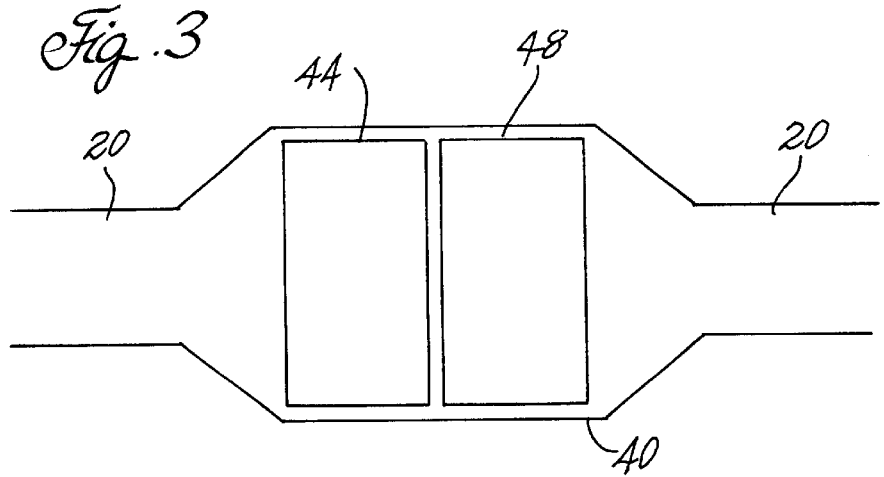
FIG. 3 is an enlarged section view of the part "A" in FIG. 1.

FIG. 3 shows the inner construction of the urea catalyst converter 40 designated as "A" in FIG. 1.

As shown in the FIG. 3, a base catalyst 44 and a Pt catalyst 48 are mounted in the urea catalyst converter 40 serially.

Figure 4:
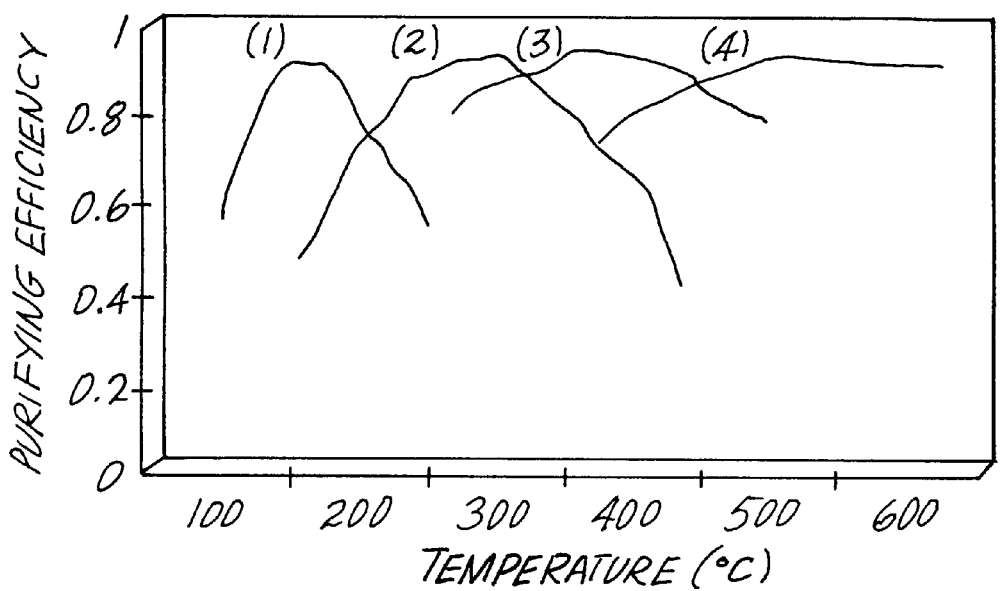
FIG. 4 is a graph showing the purifying efficiency according to the kind of the catalyst.

FIG. 4 is a graph showing the purifying efficiency according to the type of catalyst.

As shown in FIG. 4, the activation temperature of a common $Pt/Al_2O_3$ catalyst 1 is about 200° C. The window for the activation temperature is limited and has an activation range between 200 and about 250° C. Similarly, a base metal catalyst 2 is activated at 300° C. Each type of catalyst has a narrow window for the activation temperature. Therefore, it is preferred that the base metal catalyst and the Pt catalyst be linearly connected to the urea catalyst converter 30, which can have a wide range of activation temperature.

The urea supplying means is connected to the front end of the urea catalyst converter 40.

As described above, the temperature sensor 50 is mounted on the exhaust gas pipe 20 between the engine 10 and the $NO_x$ adsorber converter 30. The temperature sensor senses the temperature of the exhaust gas in order to output a result to the controller 60.

The feed pump 80 is driven by an output signal from the controller and supplies the urea in the urea tank to the injector 90.

The urea and air are mixed in the injector 90 and the mixing ratio of the urea and the air is controlled by the output signal of the controller 60.

Figure 5:
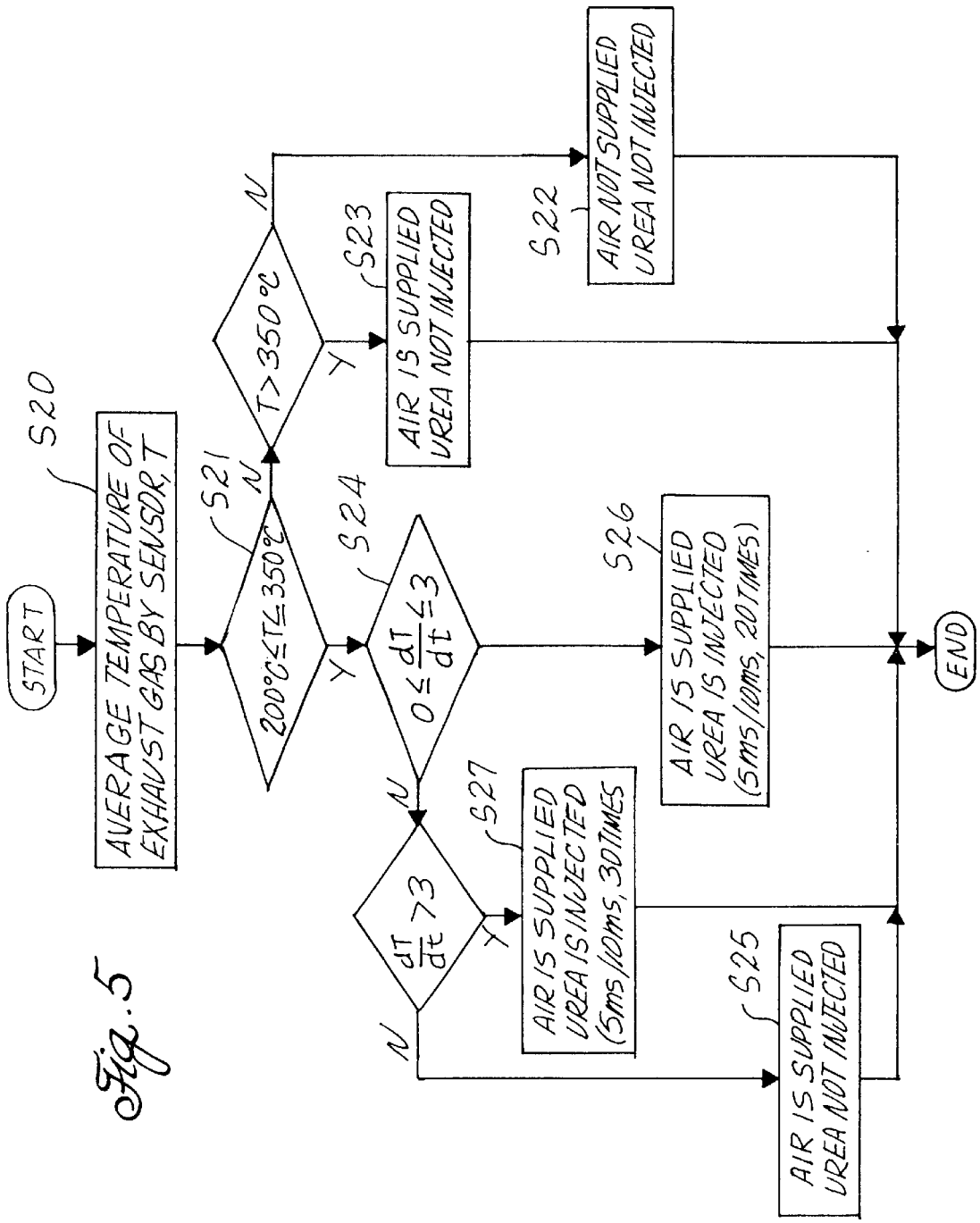
FIG. 5 is a flow chart for describing the method of controlling the purifying system of $NO_x$ in accordance with the present invention.

FIG. 5 is a flow chart showing a system and method of purifying the nitric oxide in accordance with the present invention.

The method of purifying the nitric oxide in accordance with the present invention comprises a step (S20) for sensing an average temperature of the exhaust gas by a unit time, a step (S21) for judging whether the average temperature sensed by the sensor is within a predetermined range of temperatures. When the average temperature sensed by the sensor is below the predetermined range of temperatures, urea is not injected and the air supply is blocked (S22). When the temperature sensed in step S21 is above the predetermined range of temperatures, urea is not injected, but air is supplied (S23). If the temperature sensed at step S21 is between the predetermined range of the temperatures, then a temperature gradient is compared to a predetermined range of temperature gradients (S24). If the temperature gradient is below the predetermined range of temperature gradients then air is supplied, but urea is not injected (S25). If the temperature gradient is within the predetermined range of temperature gradients, then air is supplied and urea is injected for a duration, followed by an interval, and repeated a first number of times (S26). If the temperature gradient is above the predetermined range of temperature gradients, then air is supplied and urea is injected for a duration, followed by an interval, and repeated a predetermined number of times that is greater than the first number of times in step S26 (S27).

Figure 6:
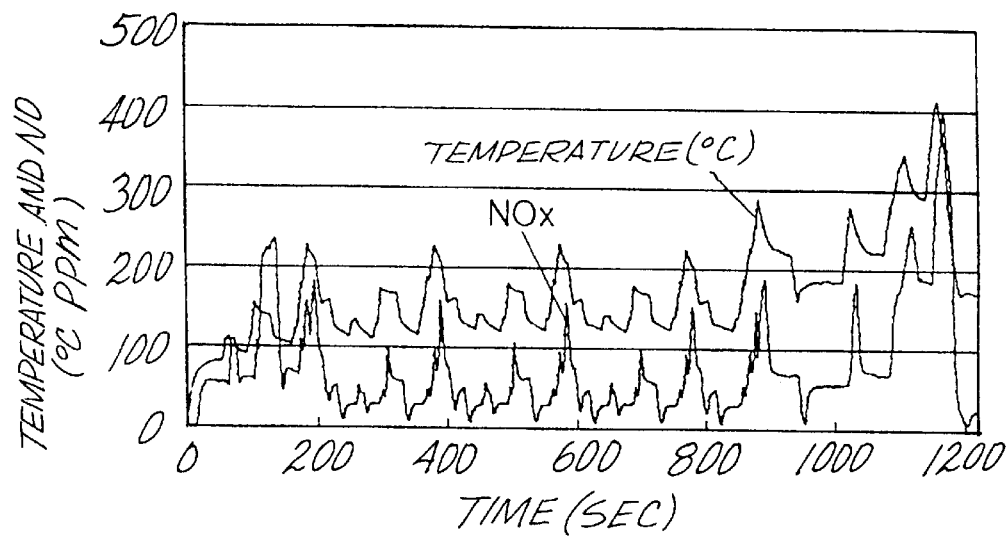
FIG. 6 is a graph showing the amount of $NO_x$ according to the change of time.

The temperature sensor 50 senses the temperature of the exhaust gas that is exhausted from the diesel engine 10. As shown in FIG. 6, there is a relationship between the temperature of the exhaust gas and the amount of $NO_x$ in the exhausted gas.

Moreover, because the nitric oxide analysis needs a predetermined time for response, a time delay is generated. Therefore if the time delay is set to about 10 seconds, the pattern of the temperature and the nitric oxide are similar throughout a range.

Figure 7:
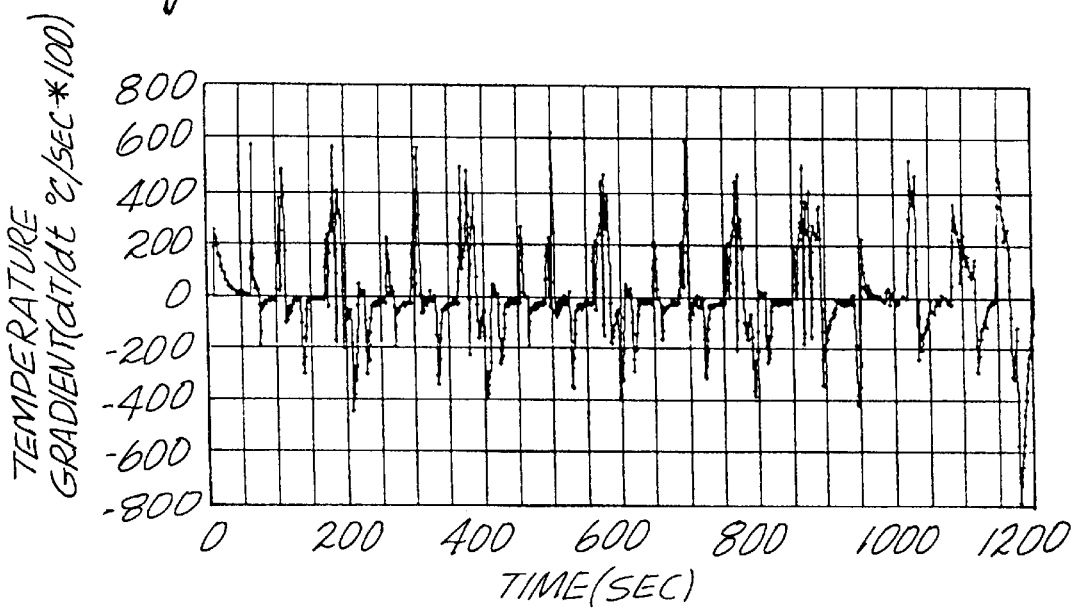
FIG. 7 is a graph showing the temperature gradient according to the change of time.

In FIG. 7, the temperature gradient (1 sec unit) to time is shown and the amount of the nitric oxide is judged according to a function of the temperature gradient.

The controller 60 is supplied with the temperature of the exhaust gas by the temperature sensor 50, and then at the step S20 the average temperature T (5 times/1 sec) is chosen by 1 sec unit.

And the controller 60 determines whether the temperature sensed at step S20 is in the range of temperatures (200° C.$\leq T \leq$350° C.) within which the exhaust gas may be purified (S21).

If the temperature T is less than 200° C., the controller determines that the exhaust gas need not be purified. The controller 60 does not operate the injector 90, air is not supplied, and urea is not injected at the entrance of the urea catalyst converter (S22).

If the temperature T of the exhaust gas exceeds 350° C., the injector 90 is controlled to inject air only. Therefore, the injector 90 is cooled and the supplying operation of the urea is stopped.

When the temperature T of the exhaust gas is between the range 200° C.$\leq T \leq$350° C., the controller 60 also determines whether the temperature gradient dT/dt (° C./sec) is between a predetermined range of conditions within which urea is to be injected. (S24)

If the temperate gradient dT/dt is less than 0, the controller 60 judges that the amount of the nitric oxide is extremely reduced, air only is supplied, and urea in not injected.

If the temperate gradient dT/dt is between the range $0 \leq dT/dt \leq 3°$ C./sec, then the feed pump 80 is operated by the output signal of the controller 60. A mixture of air and urea is injected into the entrance of the urea catalyst converter 40 by the output signal of the controller 60. The urea is injected for 5 ms, with an interval of 10 ms, a predetermined number of times (20 times) (S26).

Moreover, if the temperature gradient dT/dt exceeds 3° C./sec ($dT/dt \geq 3$), the controller 60 operates the injector 90 and the feed pump 80. Urea is pumped from the urea tank 70 and injected to the entrance of the urea catalyst converter 40 with air through the injector 90. At this time, the urea is injected for 5 ms, with an interval 10 ms, a predetermined number of times (30 times), which is more than the amount of the urea injected when the temperature gradient dT/dt is within the range $0 \leq dT/dt \leq 3°$ C./sec.

Therefore, the apparatus in accordance with the present invention occludes the $NO_x$ until the temperature of the exhaust gas reaches to the 200° C. using a BaO catalyst in the $NO_x$ adsorber converter 30, and then the $NO_x$ occluded in the converter 30 is separated from the BaO catalyst and discharged.

The urea supplied into the urea catalyst converter 40 when the temperature of the exhaust gas is above 200° C., the base catalyst and the Pt catalyst totally purify the discharged $NO_x$.

A common urea catalyst converter has a purifying efficiency of 65%, the apparatus in accordance with the present invention can have a maximum purifying efficiency of 80%.

What is claimed is:

1. A method of purifying the nitric oxide in the exhaust gas from a diesel engine, comprising:

a temperature sensing step for sensing an average temperature of the exhaust according to a unit time and for sensing a temperature gradient over a unit time dT/dt;

a range determining step for determining whether the average temperature sensed in the temperature sensing step is within a predetermined range of temperatures;

a first injection step wherein urea is not injected and air is supplied when the average temperature sensed in the temperature sensing step is higher than the predetermined range of temperatures;

a withholding step wherein neither air or urea is injected when the average temperature sensed in the temperature sensing step is less than the predetermined range of temperatures;

a temperature gradient range determining step for determining whether the temperature gradient sensed in the temperature sensing step is within a predetermined range of temperature gradients;

an air injecting step wherein the urea is not injected and the air is supplied when the average temperature sensed in the temperature sensing step is within the predetermined range of average temperatures and the temperature gradient sensed in the temperature sensing step is less than the predetermined range of temperature gradients;

a first air and urea injecting step injecting the urea and supplying the air a predetermined number of times when the average temperature sensed in the temperature sensing step is within the predetermined range of average temperatures and when the temperature gradient sensed in the temperature sensing step is within the predetermined range of temperature gradients; and a second air and urea injecting step injecting the urea and the air a predetermined number of times that is higher than the predetermined number of times of the first air and urea injecting step when the average temperature sensed in the temperature sensing step is within the predetermined range of average temperatures and when the temperature gradient sensed in the temperature sensing step exceeds the predetermined range of temperature gradients;

wherein the predetermined range of temperature gradients is $0 \leq dT/dt \leq 3°$ C./sec and wherein if the temperate gradient dT/dt is within the predetermined range of temperature gradients and the average temperature of the exhaust gas is within the predetermined range of average temperatures, the urea is injected with the air for 5 ms followed by an interval of 10 ms 20 times.

2. A method of purifying the nitric oxide in the exhaust gas from a diesel engine, comprising:

a temperature sensing step for sensing an average temperature of the exhaust according to a unit time and for sensing a temperature gradient over a unit time dT/dt;

a range determining step for determining whether the average temperature sensed in the temperature sensing step is within a predetermined range of average temperatures;

a first injection step wherein urea is not injected and air is supplied when the average temperature sensed in the temperature sensing step is higher than the predetermined range of temperatures;

a withholding step wherein neither air or urea is injected when the average temperature sensed in the temperature sensing step is less than the predetermined range of average temperatures;

a temperature gradient range determining step for determining whether the temperature gradient sensed in the temperature sensing step is within a predetermined range of temperature gradients;

an air injecting step wherein the urea is not injected and the air is supplied when the average temperature sensed in the temperature sensing step is within the predetermined range of average temperatures and when the temperature gradient sensed in the temperature sensing step is less than the predetermined range of temperature gradients;

a first air and urea injecting step injecting the urea and supplying the air a predetermined number of times when the average temperature sensed in the temperature sensing step is within the predetermined range of average temperatures and when the temperature gradient sensed in the temperature sensing step is within the predetermined range of temperature gradients; and a second air and urea injecting step injecting the urea and the air a predetermined number of times that is higher than the predetermined number of times of the first air and urea injecting step when the average temperature sensed in the temperature sensing step is within the predetermined range of average temperatures and when the temperature gradient sensed in the temperature sensing step exceeds the predetermined range of temperature gradients;

wherein the predetermined range of temperature gradients is $0 \leq dT/dt \leq 3°$ C./sec and wherein if the temperature gradient dT/dt is above the predetermined range of temperature gradients and the average temperature of the exhaust gas is within the predetermined range of average temperatures, the urea is injected with the air for 5 ms followed by an interval of 10 ms 30 times.

* * * * *